(12) United States Patent
Olson et al.

(10) Patent No.: US 6,328,124 B1
(45) Date of Patent: *Dec. 11, 2001

(54) SNOWMOBILE FRONT SUSPENSION

(75) Inventors: Jerry A. Olson, Roseau; Jeffrey A. Eaton, Wannaska, both of MN (US)

(73) Assignee: Polaris Industries Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/416,926

(22) Filed: Oct. 13, 1999

Related U.S. Application Data

(63) Continuation of application No. 08/947,984, filed on Oct. 9, 1997, now Pat. No. 6,125,958.

(51) Int. Cl.$^7$ .......................... B62M 27/02; B62B 13/08
(52) U.S. Cl. ........................ 180/182; 180/186; 180/190; 280/16; 280/21.1
(58) Field of Search ........................ 180/182, 190, 180/186, 183, 184, 185; 280/124.128, 124.132, 124.148, 124.135, 124.145, 124.146, 16, 17, 22, 22.1, 21.1, 14.26, 25, 28.15

(56) References Cited

U.S. PATENT DOCUMENTS

| 4,641,854 | * | 2/1987 | Masuda et al. | 280/701 |
| 4,671,521 | * | 6/1987 | Talbot et al. | 280/21.1 |
| 4,892,165 | | 1/1990 | Yasui et al. | 180/190 |
| 5,029,664 | | 7/1991 | Zulawski | 180/190 |
| 5,443,278 | * | 8/1995 | Berto | 280/28 |
| 5,503,242 | | 4/1996 | Jeffers | 180/182 |
| 5,992,552 | * | 11/1999 | Eto | 180/190 |
| 6,009,966 | * | 1/2000 | Olson et al. | 180/182 |

FOREIGN PATENT DOCUMENTS

| 1227823 | | 10/1987 | (CA) | 305/38 |
| 0005290 | | 1/1991 | (JP) | 180/190 |
| 0007674 | | 1/1991 | (JP) | 180/190 |
| 406080093 | * | 3/1994 | (JP) | 180/190 |

* cited by examiner

Primary Examiner—Anne Marie Boehler
(74) Attorney, Agent, or Firm—Fredrickson & Byron, PA

(57) ABSTRACT

A front snowmobile suspension of the type having a ski carried at the front end of a trailing arm. The rear end of the trailing arm is pivotably secured to the chassis and the front end of the trailing arm is pivotably secured to the chassis by a pair of generally transversely mounted radius rods which in turn are pivotably secured to the chassis. Each radius rod has an inner end pivotably attached to the chassis and an outer end pivotably attached to the front end of the trailing arm. The outer ends of the radius rods are positioned forwardly of the inner ends of the radius rods a sufficient distance that the radius rods, viewed from the top, form an angle of at least about 15° with respect to a transverse plane that is perpendicular to the chassis centerline.

17 Claims, 3 Drawing Sheets

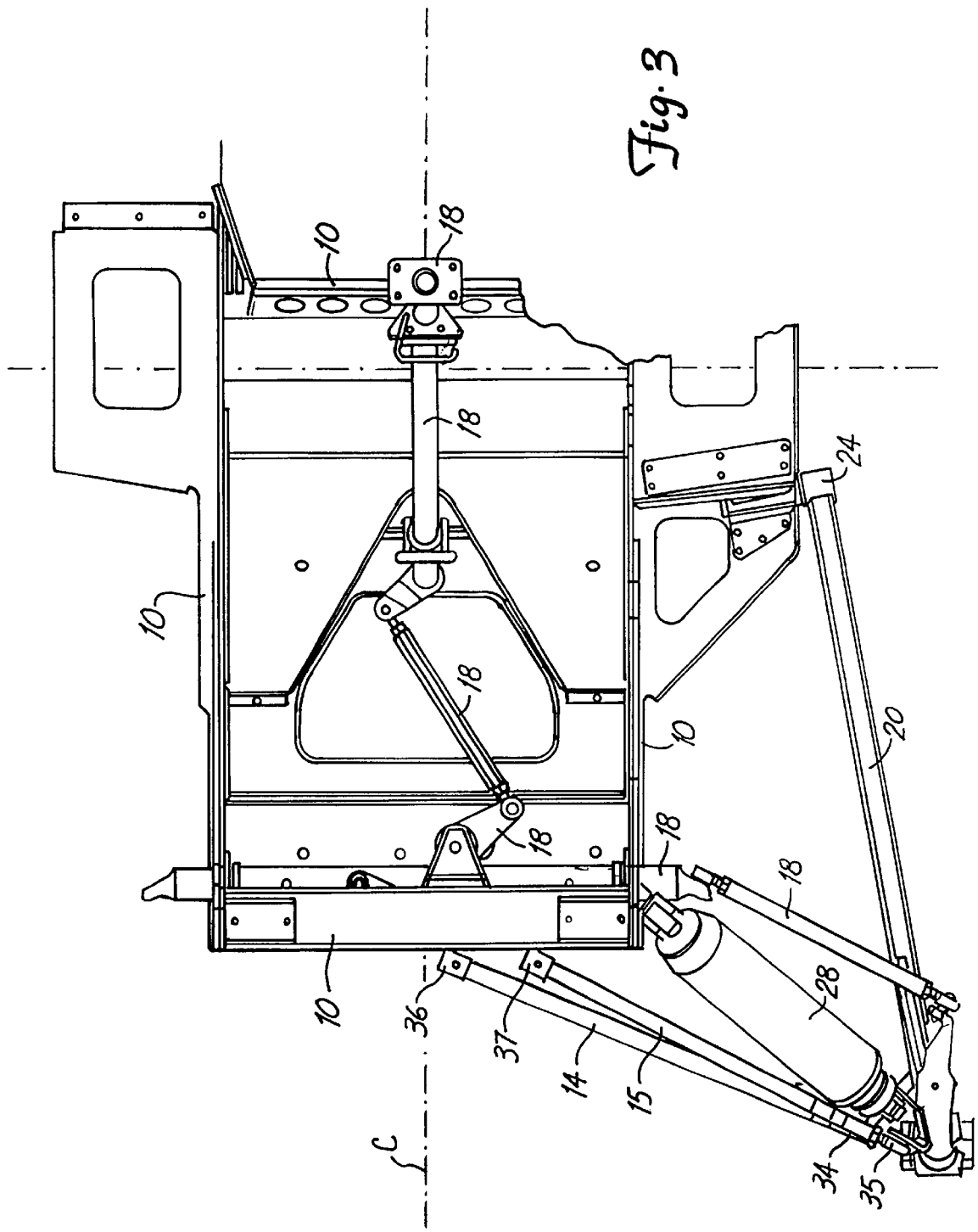

SNOWMOBILE FRONT SUSPENSION

CROSS REFERENCE TO RELATED APPLICATIONS

This application is a continuation of U.S. patent application Ser. No. 08/947,984, filed Oct. 9, 1997, now U.S. Pat. No. 6,125,958.

TECHNICAL FIELD

The invention relates to snowmobile front suspension systems, and, in particular, to improvements in independent front suspension systems of the type employing a rear trailing arm and a pair of transversely mounted radius rods.

BACKGROUND OF THE INVENTION

A variety of front suspension systems have been employed on snowmobiles over the years. In the early 1980's the assignee of the present invention introduced to the snowmobiling industry an independent front suspension system utilizing a trailing arm—i.e., an elongated arm having its front end connected to the steering spindle, and the rear end pivotably connected to the chassis (see, e.g., Canadian Pat. No. 1,227,823, the contents of which are hereby incorporated by reference). The trailing arm is oriented generally parallel to the snowmobile's longitudinal centerline, its front end being secured to the chassis by a pair of generally transversely mounted radius rods.

While the trailing arm/radius rod suspension system has been widely accepted in the snowmobile industry as a very good snowmobile front suspension design, applicants have found that further improvements in the system can be made, providing even better performance advantages for the rider.

SUMMARY OF THE INVENTION

The invention provides a front snowmobile suspension of the type having a ski spindle extending upwardly from a ski, the ski spindle being pivotably carried by the front end of a trailing arm. The rear end of the trailing arm is pivotably secured to the chassis and the front end of the trailing arm is pivotably connected to a pair of generally transverse radius rods which in turn are pivotably secured to the chassis. Each radius rod has an inner end pivotably attached to the chassis and an outer end pivotably attached to the front end of the trailing arm. The radius rods permit upward and downward movement of the front end of the trailing arm. The outer ends of the radius rods are positioned forwardly of the inner ends of the radius rods a sufficient distance that the radius rods, viewed from the top, form an angle of at least about 15° with respect to a transverse plane that is perpendicular to the chassis centerline. This unique positioning of the radius rods arm has been found to reduce lateral scrub of the skis as they move upwardly and downwardly through their respective ranges of motion.

BRIEF DESCRIPTION OF THE DRAWINGS

FIG. 3 is a top view of the portion of the chassis shown in FIG. 2.

DETAILED DESCRIPTION OF THE INVENTION

Figure 1:
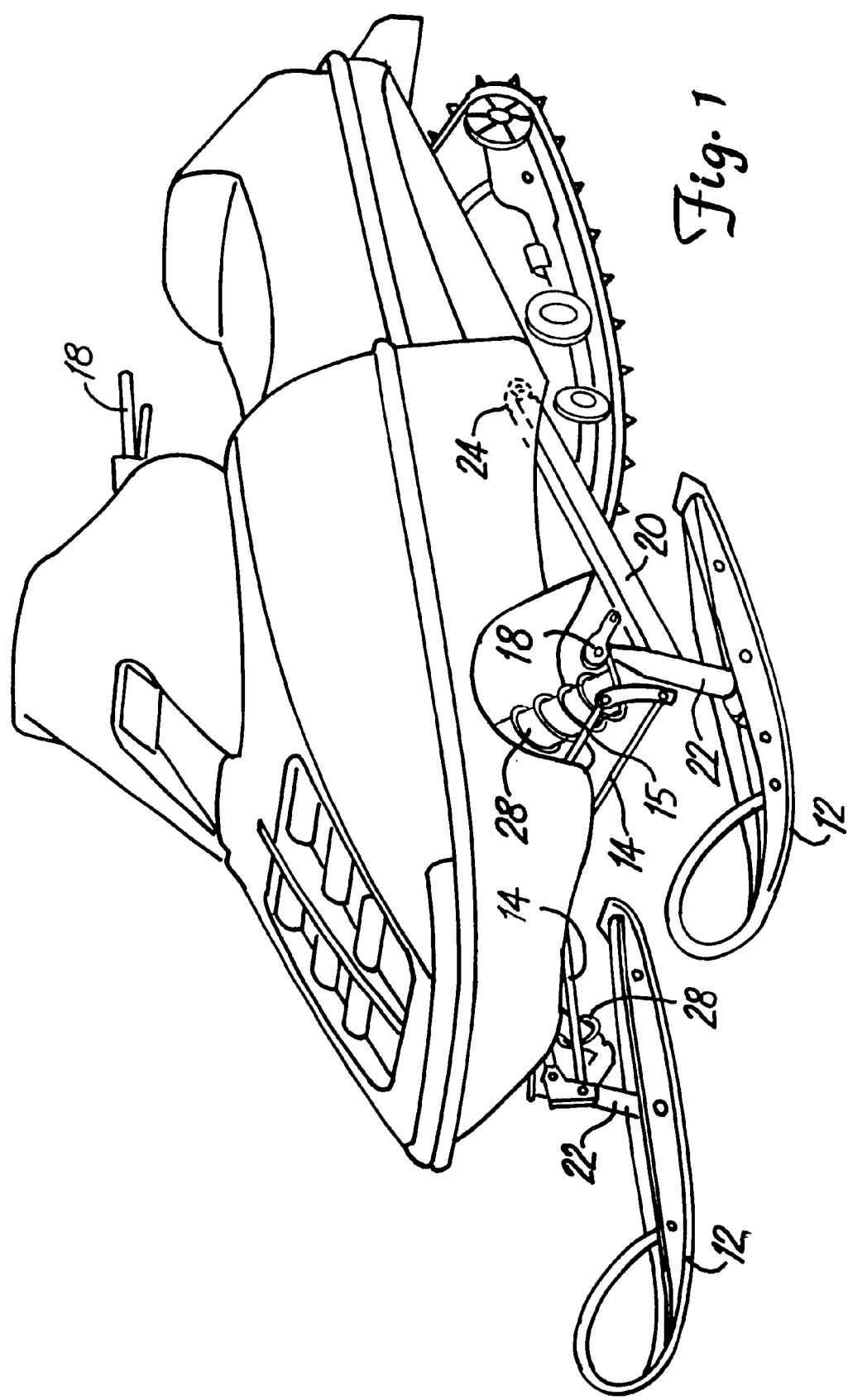
FIG. 1 is a perspective view of a snowmobile incorporating the front suspension of the invention.
Figure 2:
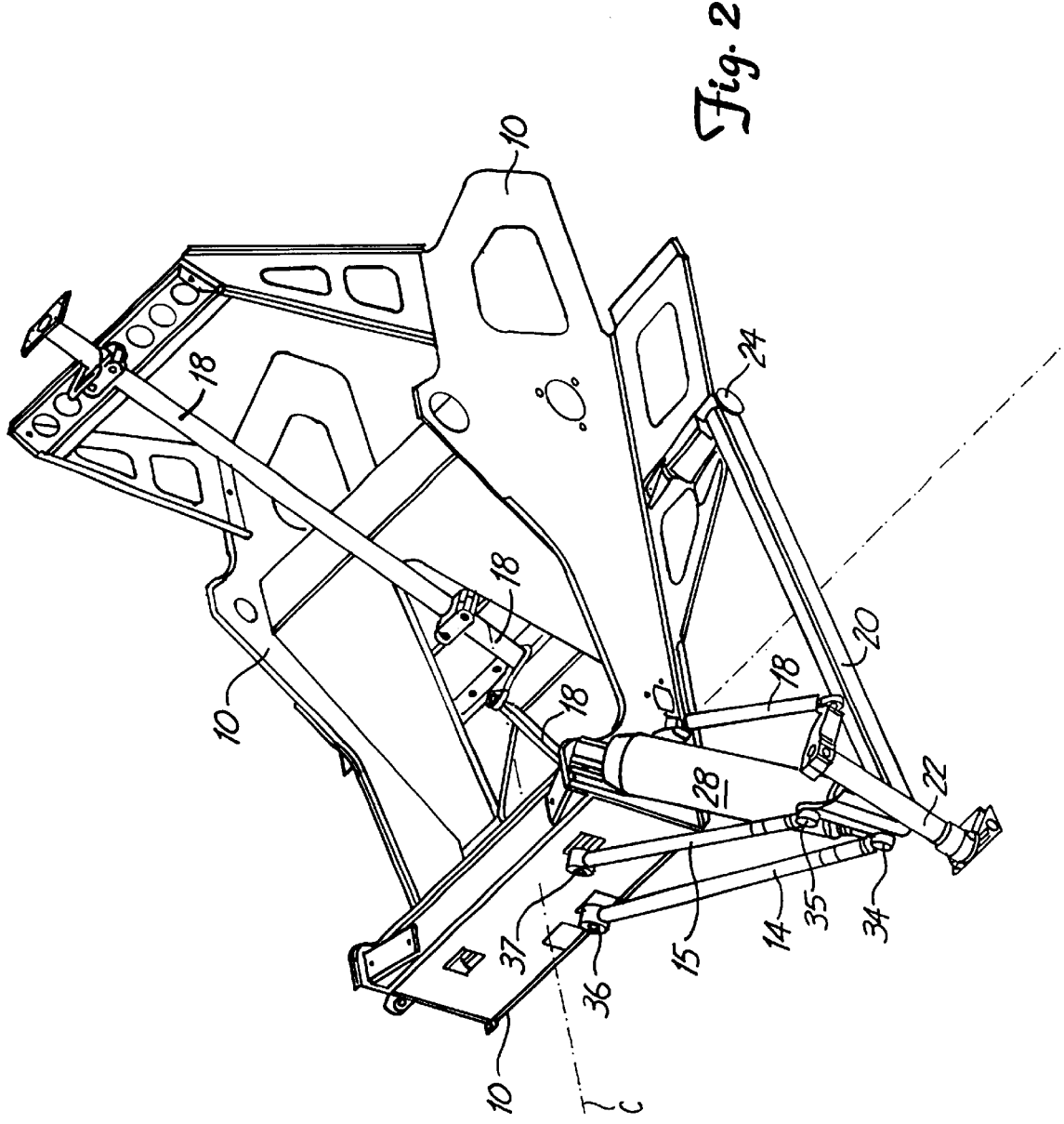
FIG. 2 is a perspective view of a portion of the chassis of a snowmobile illustrating attachment of the front suspension of the invention to the chassis.

FIG. 1 depicts generally a snowmobile having a front suspension of the invention, and FIGS. 2–3 provide further details regarding the components of the suspension. The chassis 10 of the snowmobile (concealed by body panels and other snowmobile components in FIG. 1) provides a basic framework to which the various components of the suspension system of the invention may be mounted. As indicated above, the suspension system is generally considered to be an independent suspension system since the left and right skis are permitted to move upwardly and downwardly generally independently of each other (in many cases, however, it is desirable to connect the two sides through a torsion bar, as is described in detail in the Canadian patent identified above). Thus, each side of the suspension system is essentially a mirror image of the other, and the following discussion of the system will be with reference to the left side of the system, as shown in detail in FIGS. 2–3.

The ski 12 is secured to an upwardly extending spindle. The spindle in turn is rotatably disposed within (and, in the drawings, concealed by) a generally cylindrical sleeve 22 carried at the front end of the trailing arm 20. The spindle is rotated by a steering linkage system (various components of which are identified by the common reference number 18 in the drawings) to cause the ski to turn in the desired direction.

The front end of the trailing arm 20 is linked to the chassis 10 by a pair of radius rods 14 and 15 which are oriented generally transversely to the centerline "C" of the snowmobile. The radius rods have pivotable joints on each end to permit the front end of the trailing arm 20 to move upward and downward. The rear end 24 of the trailing arm 20 is also pivotably mounted to the chassis in such a fashion as to permit the front end of the trailing arm 20 to move upward and downward. The combination of the radius rods 14 and 15 and the trailing arm 20 thus provide a geometrically stable mounting structure for the ski 12. A suitable shock absorber 28 and coil spring typically is connected from the front end of the trailing arm 20 to the chassis 10 to provide the suspension with the desired suspension characteristics.

To provide enhanced performance for the suspension the outer ends 34 and 45 of the radius rods 14 and 15 are mounted substantially further forwardly of the inner ends 36 and 37 of the radius rods 14 and 15 than in prior art trailing arm suspension systems. Consequently, the radius rods 14 and 15 are set at an angle α with respect to a transverse plane that is perpendicular to the centerline "C"; desirably α is at least about 15°, and preferably a is at least about 20°. A particularly preferred embodiment illustrated in the drawings has radius rods 14 and 15 with unequal length—the shorter radius rod 15 preferably forms an angle α of at least about 25°. (In FIG. 3, the shorter radius rod 15 forms an angle α of about 28°, and the longer radius rod 14 forms an angle α of about 22°.) As can be seen in FIG. 3, the pivot axes of the inner ends 36 and 37 of the radius rods 14 and 15 similarly are set at a corresponding angle to the centerline "C."

By moving the outer ends 34 and 35 of the radius rods 14 and 15 forwardly in comparison to prior art trailing arm suspensions the suspension system allows the ski to move upwardly and downwardly with less lateral scrub. That is, because the radius rods 14 and 15 cause the front end of the trailing arm 20 (and, thus, the ski 12) to move through a broad arc as the ski and suspension move up and down with respect to the chassis 10, if viewed from the front one would see that the ground-contacting surface of the skis move laterally in and out a small distance as the ski travels through this arc. This lateral movement is generally referred to as scrub. The improvements of the present invention allow the ski to move through the same arc length with substantially less lateral scrub, which therefore provides better handling and less loading on the suspension components. Part of this advantage relates to the additional length of the radius rods that this geometry permits (i.e., if the skis are kept the same distance apart as in a prior art snowmobile, the angling of the radius rods permits the rods to be longer without increasing this width), and part of the advantage is due directly to the angled geometry of the system (i.e., scrub would be reduced by angling the radius rods, even if they were kept the same length).

As can also be seen from FIG. 3, the outer end of the shock absorber 28 is similarly mounted substantially further forwardly of the inner end of the shock absorber 28 than in prior art trailing arm suspension systems. FIG. 3 illustrates the fact that the angle of the shock absorber 28 (with respect to a transverse plane that is perpendicular to the centerline "C") is greater than the corresponding angle ($\alpha$) of the radius rods 14 and 15. This fact is due to the inherent geometry of the system, since the outer ends of the radius rods 14 and 15 and the outer end of the shock absorber 28 are all connected to the front end of the trailing arm 20. As stated above, angle $\alpha$ of the radius rods is desirably about 15° (with respect to a transverse plane that is perpendicular to the centerline "C") preferably $\alpha$ is at least 20°, and, in a particularly preferred embodiment illustrated in the drawings, radius rod 15 forms an angle $\alpha$ of at least about 25°. Thus, since the angle of the shock absorber 28 is greater than the angle of the radius rods, the angle of the shock absorber 28 (with respect to a transverse plane that is perpendicular to the centerline "C") is desirably greater than 15°, preferably greater than 20°, and, in a particularly preferred embodiment illustrated in the drawings, greater than 25°.

While a preferred embodiment of the present invention has been described, it should be understood that various changes, adaptations and modifications may be made therein without departing from the spirit of the invention and the scope of the appended claims.

What is claimed is:

1. A snowmobile comprising;
   a chassis having a longitudinal centerline, and a pair of skis, each ski being secured to the chassis by a ski suspension system including
     a ski spindle extending upwardly from the ski,
     a generally longitudinally extending trailing arm having front and rear ends, the front end of the trailing arm including a generally cylindrical sleeve for pivotably receiving the ski spindle therein, and the rear end of the trailing arm being pivotably secured to the chassis;
     a pair of generally transversely mounted radius rods, each radius rod having an inner end pivotably attached to the chassis and an outer end pivotably attached to the front end of the trailing arm; and
     a shock absorber having an inner end connected to the chassis and an outer end connected to the front end of the trailing arm;
   the outer end of the shock absorber being positioned forwardly of the inner end of the shock absorber a sufficient distance that the shock absorber, viewed from the top, forms an angle of greater than 15° with respect to a transverse plane that is perpendicular to the chassis centerline.

2. The snowmobile of claim 1 wherein the outer end of the shock absorber is positioned forwardly of the inner end of the shock absorber a sufficient distance that the shock absorber, viewed from the top, forms an angle of greater than 20° with respect to a transverse plane that is perpendicular to the chassis centerline.

3. The snowmobile of claim 1 wherein the outer end of the shock absorber is positioned forwardly of the inner end of the shock absorber a sufficient distance that the shock absorber, viewed from the top, forms an angle of greater than 25° with respect to a transverse plane that is perpendicular to the chassis centerline.

4. The snowmobile of claim 1 wherein the outer ends of the radius rods are positioned forwardly of the inner ends of the radius rods a sufficient distance that the radius rods, viewed from the top, form an angle of at least 15° with respect to a transverse plane that is perpendicular to the chassis centerline.

5. The snowmobile of claim 1 wherein the pivot axes of the inner ends of the radius rods each form an angle of at least 15° with respect to the chassis centerline.

6. The snowmobile of claim 1 wherein the outer end of at least one of the radius rods is positioned forwardly of the inner end of such radius rod a sufficient distance that the radius rod, viewed from the top, forms an angle of at least 15° with respect to a transverse plane that is perpendicular to the chassis centerline.

7. A snowmobile comprising a chassis having a longitudinal centerline, and a pair of skis, each ski being secured to the chassis by a suspension system including a trailing arm, having front and rear ends, a pair of radius rods which each have an inner end and an outer end, the outer ends of the radius rods being connected to the front end of the trailing arm and being positioned forwardly of the inner ends of the radius rods, and a shock absorber having an inner end connected to the chassis and an outer end connected to the front end of the trailing arm, the outer end of the shock absorber being positioned forwardly of the inner end of the shock absorber a sufficient distance that the shock absorber, viewed from the top, forms an angle of greater than 15° with respect to a transverse plane that is perpendicular to the chassis centerline.

8. The snowmobile of claim 7 wherein the suspension system further includes a ski spindle extending upwardly from the ski, the front end of the trailing arm including a generally cylindrical sleeve pivotably receiving the ski spindle therein.

9. The snowmobile of claim 7 wherein the outer ends of the radius rods are positioned forwardly of the inner ends of the radius rods a sufficient distance that at least one of the radius rods, viewed from the top, forms an angle of at least 15° with respect to a transverse plane that is perpendicular to the chassis centerline.

10. The snowmobile of claim 7 wherein the outer end of the shock absorber is positioned forwardly of the inner end of the shock absorber a sufficient distance that the shock absorber, viewed from the top, forms an angle of greater than 20° with respect to a transverse plane that is perpendicular to the chassis centerline.

11. The snowmobile of claim 7 wherein the outer end of the shock absorber is positioned forwardly of the inner end of the shock absorber a sufficient distance that the shock absorber, viewed from the top, forms an angle of greater than 25° with respect to a transverse plane that is perpendicular to the chassis centerline.

12. A snowmobile comprising;
   a chassis having a longitudinal centerline, and a pair of skis, each ski being secured to the chassis by a ski suspension system including
     a ski spindle extending upwardly from the ski,
     a generally longitudinally extending trailing arm having front and rear ends, the front end of the trailing arm including a generally cylindrical sleeve for pivotably receiving the ski spindle therein, and the rear end of the trailing arm being pivotably secured to the chassis; and a shock absorber having an inner end connected to the chassis and an outer end connected to the front end of the trailing arm;

the outer end of the shock absorber being positioned forwardly of the inner end of the shock absorber a sufficient distance that the shock absorber, viewed from the top, forms an angle of greater than 15° with respect to a transverse plane that is perpendicular to the chassis centerline.

13. The snowmobile of claim 12, further including a pair of radius rods for each ski, each radius rod having an inner end pivotably attached to the chassis and an outer end pivotably attached to the front end of the trailing arm.

14. The snowmobile of claim 13 wherein the outer end of at least one of the radius rods is positioned forwardly of the inner end of such radius rod a sufficient distance that the radius rod, viewed from the top, forms an angle of at least 15° with respect to a transverse plane that is perpendicular to the chassis centerline.

15. The snowmobile of claim 13, wherein the outer ends of the radius rods are positioned forwardly of the inner ends of the radius rods.

16. The snowmobile of claim 15, wherein the outer ends of the radius rods are positioned forwardly of the inner ends of the radius rods a sufficient distance that the radius rods, viewed from the top, form an angle of at least 15° with respect to a transverse plane that is perpendicular to the chassis centerline.

17. The snowmobile of claim 15 wherein the pivot axes of the inner ends of the radius rods each form an angle of at least 15° with respect to the chassis centerline.

\* \* \* \* \*